United States Patent
Fromherz (10) Patent No.: US 7,233,405 B2
(45) Date of Patent: Jun. 19, 2007

(54) PLANNING AND SCHEDULING RECONFIGURABLE SYSTEMS WITH REGULAR AND DIAGNOSTIC JOBS

(75) Inventor: Markus P. J. Fromherz, Palo Alto, CA (US)

(73) Assignee: Palo Alto Research Center, Incorporated, Palo Alto, CA (US)

(*) Notice: Subject to any disclaimer, the term of this patent is extended or adjusted under 35 U.S.C. 154(b) by 897 days.

(21) Appl. No.: 10/284,560

(22) Filed: Oct. 30, 2002

(65) Prior Publication Data

US 2004/0085561 A1 May 6, 2004

(51) Int. Cl.
- G06F 15/00 (2006.01)
- G06F 19/00 (2006.01)
- G06F 9/455 (2006.01)

(52) U.S. Cl. .............. 358/1.13; 358/1.16; 700/96; 700/100; 700/103; 703/23

(58) Field of Classification Search .......... 358/1.13, 358/1.16; 703/16, 19, 22, 27; 700/6, 96, 700/100, 103
See application file for complete search history.

(56) References Cited

U.S. PATENT DOCUMENTS

| | | | |
|---|---|---|---|
| 5,095,342 A | 3/1992 | Farrell et al. | 355/319 |
| 5,159,395 A | 10/1992 | Farrell et al. | 355/319 |
| 5,557,367 A | 9/1996 | Yang et al. | 355/202 |
| 5,631,740 A | 5/1997 | Webster et al. | 358/296 |
| 5,696,893 A | 12/1997 | Fromherz et al. | 395/112 |
| 6,546,364 B1 * | 4/2003 | Smirnov et al. | 703/22 |
| 2002/0107914 A1 | 8/2002 | Charisius et al. | 709/203 |

FOREIGN PATENT DOCUMENTS

WO    WO 00/38091    6/2000

OTHER PUBLICATIONS

Robert P. Goldman and Mark S. Boddy, "A Constraint-Based Scheduler for Batch Manufacturing", IEEE Expert, IEEE Inc. New York, vol. 12, No. 1, Jan.-Feb. 1997, pp. 49-56.

* cited by examiner

Primary Examiner—King Y. Poon
Assistant Examiner—Thomas J. Lett
(74) Attorney, Agent, or Firm—Linda M. Robb (57) ABSTRACT

A system is provided to allow for automated planning and scheduling the work flow for reconfigurable production systems having a plurality of modules, with each module having alternative capabilities. The system includes a system controller, a planning function for planning the concurrent production of regular and diagnostic work units, and a scheduling function for scheduling the concurrent production of regular and diagnostic work units.

37 Claims, 4 Drawing Sheets

PLANNING AND SCHEDULING RECONFIGURABLE SYSTEMS WITH REGULAR AND DIAGNOSTIC JOBS

CROSS REFERENCE TO RELATED APPLICATIONS

The following copending applications, U.S. application Ser. No. 10/284,561, titled "Planning and Scheduling Reconfigurable Systems with Many Alternative Capabilities", and U.S. application Ser. No. 10/284,514, titled "Planning and Scheduling Reconfigurable Systems around Off-line Resources", all filed of even date, are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,631,740 to Webster et al. ("Transducers with Constraints Model for Print Scheduling"); and U.S. Pat. No. 5,696,893 to Fromherz et al. ("System for Generically Describing and Scheduling Operation of Modular Printing Machine").

BACKGROUND OF THE INVENTION

This invention relates generally to a system and method for planning and scheduling work flow and processes for reconfigurable production operations and equipment, which enables a service technician to select and use diagnostic jobs, for example feeding a sheet to the module being serviced in a printer system, while the system is otherwise operating in normal mode on fobs around the off-line module.

Reconfigurable production systems increasingly consist of multiple parallel, alternative modules that are connected through flexible paths and even loops. Consequently, such systems are expected to offer a multitude of alternative operations (or capabilities) to produce the same outputs. For example, a modular printing system may consist of several identical, parallel printers connected through flexible paper paths that feed to and collect from these printers. For previous, in-line systems, the entire system was usually stopped when one of its modules went off-line, typically because of a fault, and a service technician could assume that the entire system was at their disposal during diagnostic and repair operations. With the types of parallel systems described above, it is desirable to continue using all available system capabilities by planning and scheduling around the off-line module as necessary, and at the same time interleaving diagnostic jobs as requested by the technician.

A reconfigurable production system may be modeled as a graph of connected modules, with each module described by a model of its structure and its capabilities. The structure is primarily the interface through with work units enter and exit, such as entry and exit ports, plus any internally used resources. A capability is an operation that accepts work units at entry ports, processes them, and moves them to exit ports. (Entry and exit ports here refer to mechanical interfaces, such as slots or trays, as well as computer interfaces. A port may serve as both entry and exit port.) Operation of such a system has been modeled as a sequence of capability executions as work units move along valid paths in the graph from module to module.

An example for a reconfigurable production system is a modular printer, with modules such as feeders, mark engines, paper transports, inverters, etc. There, the work units are sheets and images. A simple paper transport module has an entry port, an exit port, and a single capability, to move a sheet of paper from its entry port to its exit port. An inverter module has one entry port, one exit port, and two capabilities, one to invert a sheet of paper and one to bypass the inversion mechanism. A mark engine transfer module has two entry ports (one for sheets and one for images), one exit port (for marked sheets), and one capability, to print the image onto the sheet. A sample resource in all of these modules is the space occupied by the sheet, which may only be occupied by one sheet at a time. Other examples of reconfigurable production systems are assembly lines, for example for the assembly or packing of computer parts, and automated analytic systems, such as blood sample analysis machines. In these various production systems, work units may be sheets of paper, electronic files, computer parts, semiconductor wafers, blood sample trays, any parts or composites of these, or other physical or electronic objects being processed by production systems. Transport mechanisms may be conveyor belts or robotic arms or any other devices or functions for moving work units.

Module capabilities may be composed to system capabilities by incrementally unifying work unit and time variables of output and input events at connected modules along valid paths in the system graph. For example, if a module's exit port is connected to another module's entry port, any capability producing work units for the first module's exit port potentially can be composed with any capability consuming work units from the second module's entry port. Unification of work unit and time variables ensures the consistency of attribute and time constraints.

A scheduler for such systems receives a stream of jobs, each consisting of a sequence of desired work units to be produced at some final exit port of the system. Each desired work unit is described by a work unit variable with attribute constraints. This is used to select a suitable system capability that can produce the desired work unit by unifying the desired work unit variable with the work unit variables of system capabilities producing work units for the desired exit port. As system capabilities for the desired work units in the jobs are found, their time and resource constraints are posted to the constraint store, and the constraints are solved in order to find time values for the various module capabilities producing the desired work units. The selected module capabilities plus the time values are then sent to the modules so that they can execute the corresponding operations at the designated times.

For the purposes herein, diagnostic job is defined as a job that requires nonstandard system capabilities. Non-standard system capabilities are, for example, capabilities that do not start or end in the usual entry or exit ports, such as feeders and finishers in a printing system, and capabilities that use unusual combinations of operations, such as moving a sheet through a transfer component without marking an image on it, which is usually not permitted.

The approach to system control described above has no generic way to plan and schedule diagnostic jobs in parallel with regular jobs. One reason for this is that even regular jobs are generally not interleaved and thus no simple provision for including diagnostic jobs in parallel is available. Another reason is that the existing approach requires capabilities to start and end at regular entry or exit ports of system capabilities. The approach also does not have any provisions to execute diagnostic jobs while the rest of the system is running normally. Instead, usually the entire system is taken down if a module is off-line and being serviced.

This approach proves unsatisfactory for systems with many alternative, parallel system capabilities. With these systems, it is desirable to continue using all available system capabilities by planning and scheduling around an off-line module as necessary, while concurrently running diagnostic jobs as requested.

SUMMARY OF THE INVENTION

Briefly stated, and in accordance with one aspect of the present invention, there is provided a system to allow for automated planning and scheduling the work flow for reconfigurable production systems having a plurality of modules. Each of the modules within the reconfigurable production system has alternative capabilities. The system includes a system controller, a planning function for planning the concurrent production of regular and diagnostic work units, and a scheduling function for scheduling the concurrent production of regular and diagnostic work units.

In accordance with another aspect of the present invention there is provided a method for planning and scheduling the work flow for computer controlled reconfigurable production systems having a plurality of modules, each having alternative capabilities. The method includes planning the work flow for the reconfigurable production system and scheduling the work flow for the modules in the reconfigurable production system.

In accordance with yet another aspect of the present invention, there is provided an article of manufacture which is a computer usable medium having computer readable program code embodied in the medium. When the program code is executed by the computer, the computer is caused to perform method steps for planning and scheduling computer controlled reconfigurable production systems. The method includes planning the work flow for the reconfigurable production system and scheduling the work flow for the modules in the reconfigurable production system.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system for planning and scheduling functions within a system controller for systems having many alternative, parallel system capabilities, in which all available system capabilities remain in use while concurrently running diagnostic jobs on an off-line module. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
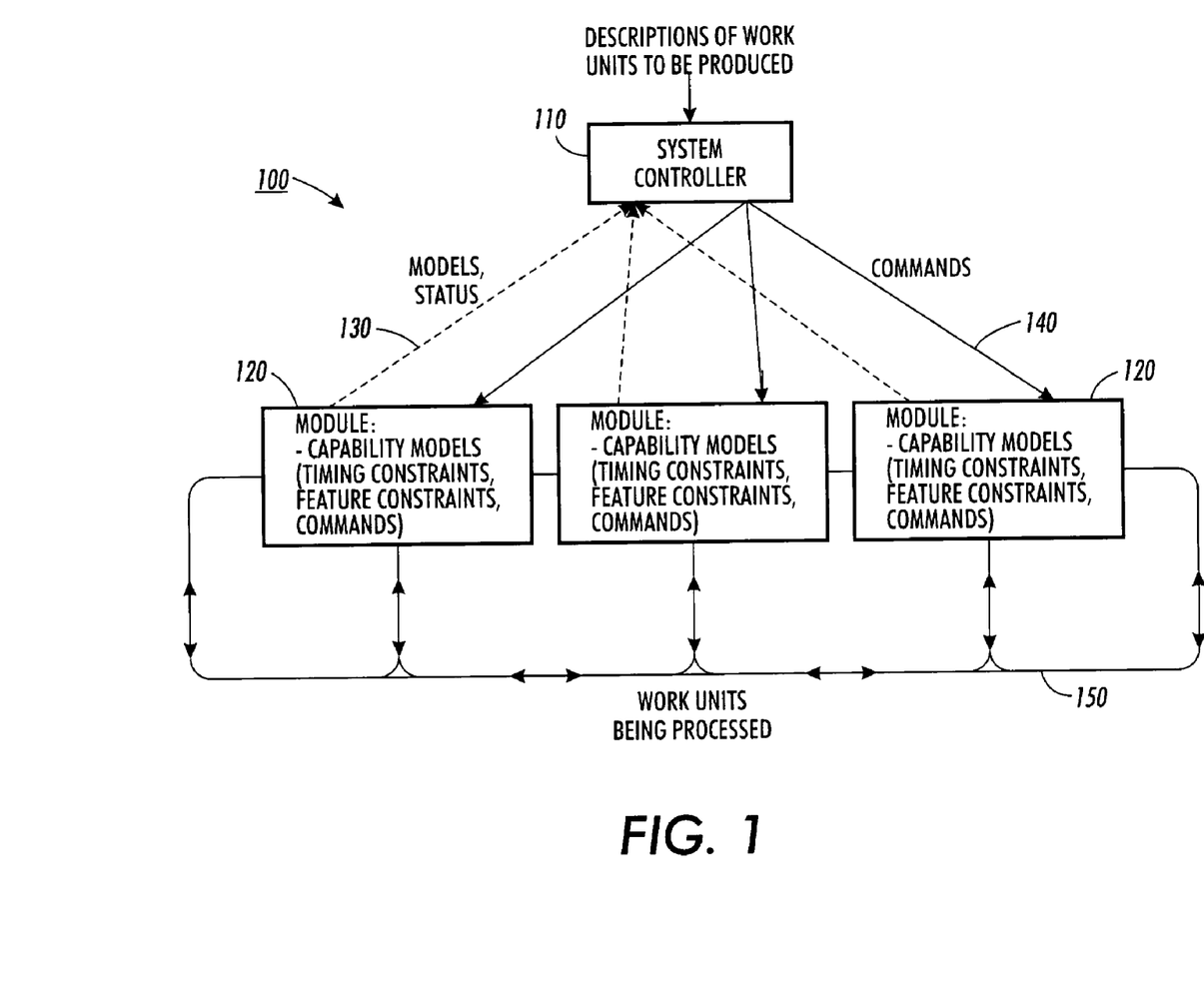
FIG. 1 illustrates a controller in accordance with one embodiment of the subject invention.

Turning now to the drawings, wherein the purpose is for illustrating the embodiments of the system and method, and not for limiting the same, FIG. 1 illustrates a controller for integrating planning and scheduling functions in conformance with one embodiment of the subject system. In a system 100, system controller 110 receives descriptions of work units to be produced from any known type of job input source. These descriptions correspond to descriptions of the desired output products. They may specify attributes (or properties) of the products, values or ranges or general constraints for these attributes, and possibly constraints on the timing of the production (e.g., deadlines), but generally without specifying how the products are to be produced.

System controller 110 also receives, along paths 130, capability models from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. Additionally there is also capability for operator feedback as to the work being scheduled on the modules and the state of the system at any point in time.

Figure 2:
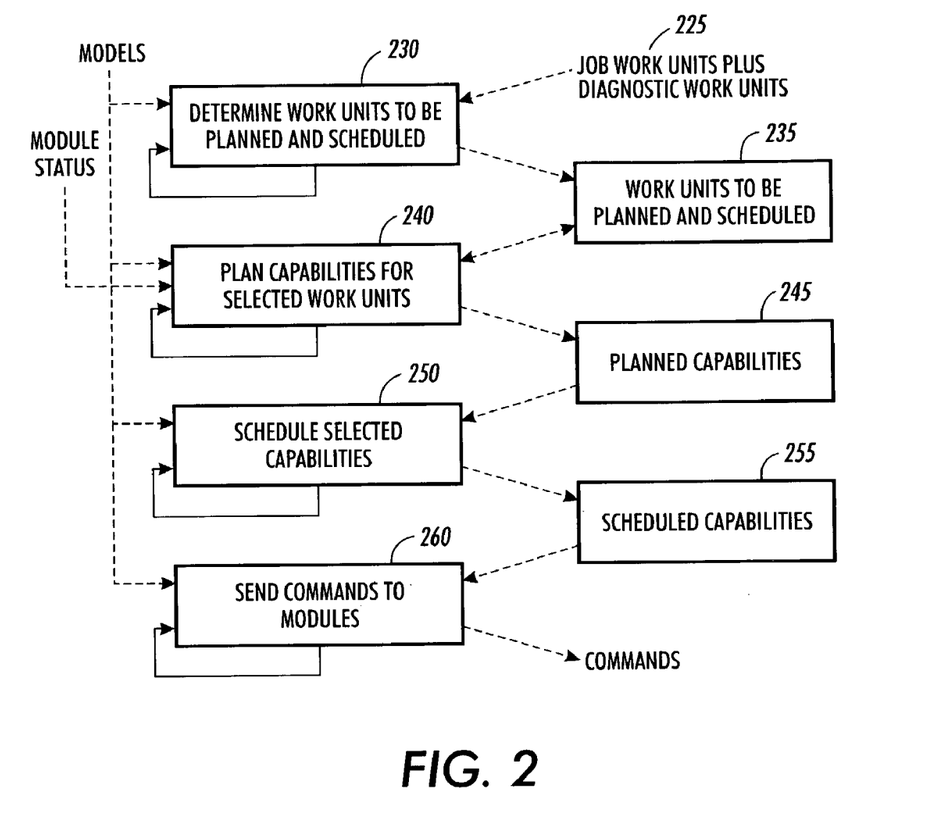
FIG. 2 provides a flow chart detailing the ordering of operations to accomplish system planning and scheduling in accordance with one embodiment of the subject invention.

FIG. 2 illustrates the planning and scheduling method of operation for the system controller. In this diagram, method steps are described in terms of data received and provided to each subsequent step in the process. Each of the steps 230, 240, 250, and 260 in this process may be executed in sequence (one after the other) or concurrently. In either case, each step consumes data 225, 235, 245, or 255 provided by a previous step and produces data 235, 245, 255, or 265 for the subsequent step. Consuming and producing this data is generally done incrementally, where a step is processing one data item after another, but may also be done in batches, as will be obvious to one skilled in the art of real-time software. Initially, a description of the work units 225, or job to be performed, is provided to the controller.

If diagnostic jobs have to be performed, corresponding work units are inserted concurrently into the job queue. Diagnostics jobs typically have higher priority and therefore are added in front of other work units to be processed. An example of a diagnostic work unit may be an ordinary or special work unit that is to be routed to and through a module being serviced, e.g., in order to observe and measure the timing or alignment of components. A diagnostic job may use other modules, e.g., to feed the required work unit to the module being serviced. A diagnostic job may be restricted to certain modules, a specified path through the system, or to certain module capabilities as needed.

The controller also has the models of the system modules available together with the current state of the system, e.g., which operations are currently performed by the modules, and any capabilities it may have previously planned and scheduled. The controller determines the work units to be planned and scheduled at step 230, based on the capability models provided by each module to be controlled and directed. This is an iterative step in which the controller incrementally reviews the jobs and their work units to select those work units to be planned and scheduled for the job next The selected work units 235 are then transmitted to step 240, which plans the capabilities for the selected work units, taking into consideration the capability model for each module. This step is repeated for each work unit selected in the previous step, resulting in a set of planned capabilities 245. With planned capabilities 245 and the module capability models, the controller at step 250 schedules the selected capabilities and provides a set of scheduled capabilities 255. These are in turn provided to step 260, at which the controller sends the commands 265 corresponding to the scheduled capabilities to the individual modules. This step is repeated for each scheduled capability. As can be seen in FIG. 2, each of steps 230, 240, 250 and 260 has all model information available for selective usage during each step. For example step 240 may access feature constraints, step 250 may utilize timing constraints, and step 260 may utilize commands.

Figure 3:
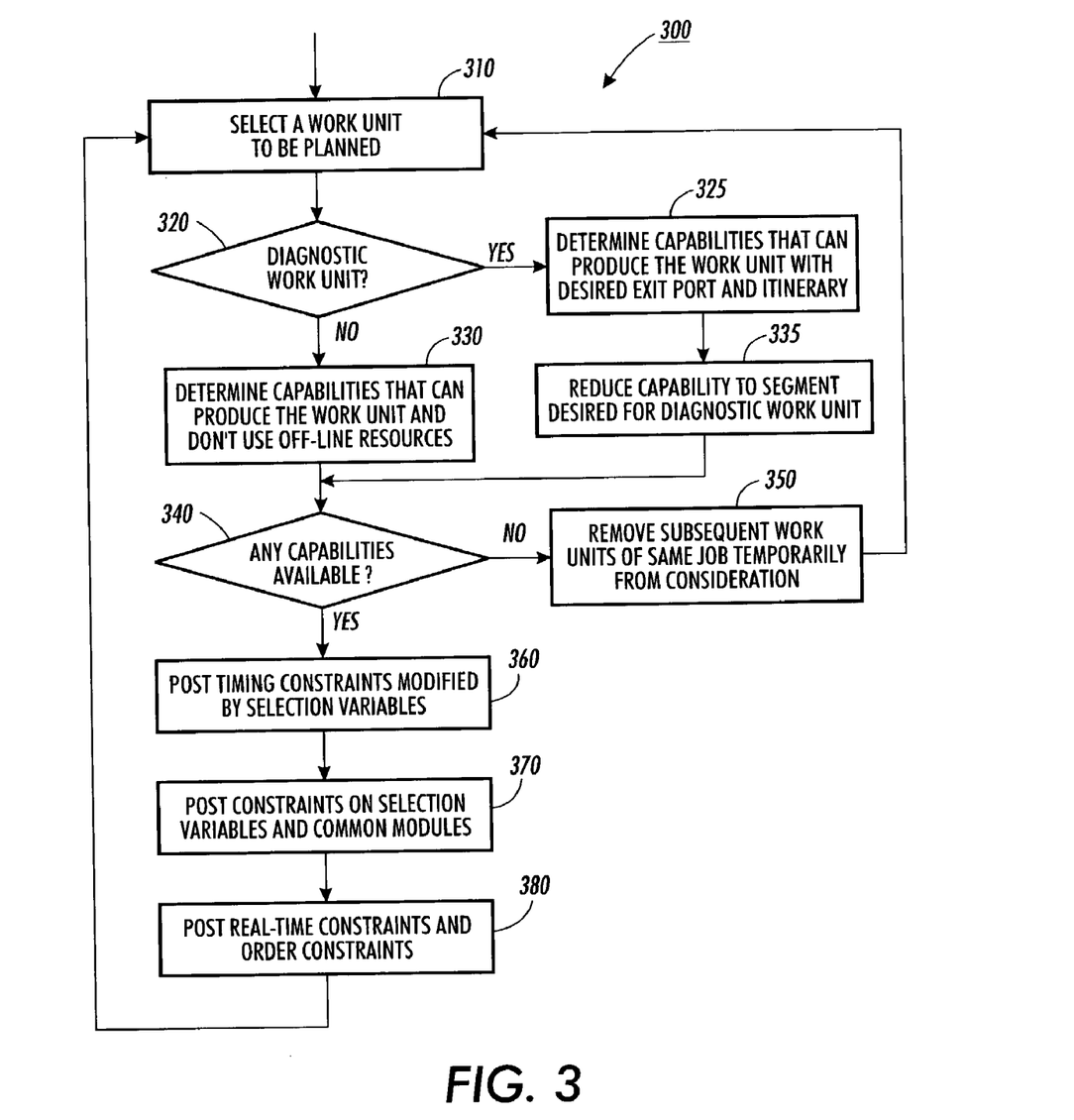
FIG. 3 provides a flow chart detailing the operation of the system planning component in accordance with one embodiment of the subject invention.

In FIG. 3, a flow chart illustrates the planning function 300 of the controller. A work unit or job to be planned is selected at step 310 based on the input job description. A determination is then made at step 320 as to whether the work unit to be planned is a diagnostic job, for example feeding a sheet to a module being serviced, while the system is otherwise working in normal mode on regular jobs around the off-line module. An off-line resource is any module or partial module that is currently unavailable, e.g., because it is powered down or broken. If the work unit is diagnostic in nature, at step 325 the controller determines the capabilities that can produce the work unit with the desired exit port and itinerary. These capabilities are then reduced to those capabilities necessary for the diagnostic work unit at 335. This is to restrict the capabilities used to those or to the path specified for the diagnostic job. If the work unit to be planned is not a diagnostic job, the controller then determines the capabilities needed to produce the work unit without off-line resources at step 330. In making this determination, the controller considers all possible system capabilities, excluding the capabilities of the off-line resource, from which alternative capabilities are selected. The controller determines if capabilities are available to produce the work unit at step 340. If sufficient capabilities are not available, subsequent work units of the same job are temporarily removed from consideration at step 350 and the controller returns to step 310 to select another work unit to be planned. The capabilities of the off-line resource cannot be selected for regular jobs. If no capability remains available for a desired work unit, all subsequent work units of the same job will be delayed, even if they could be produced, in order to avoid out-of-order output delivery.

Work units which have been temporarily removed from consideration for planning and scheduling because of off-line resources are automatically re-considered in step 310 on subsequent iterations and will be delayed again if the required resources are still off-line. Alternatively, the work units can be marked by the resources they need and will be re-inserted in the set of work units to be planned and scheduled when those resources become available. In either case, the work units will be re-considered for planning and scheduling as soon as capabilities to process them will be available.

If sufficient capabilities for producing the work unit are available, timing constraints, such as the amount of time required for each task within a job (e.g., the duration of a transport operation or a processing step), constraints on the intervals during which resources are occupied, and the reservation of resources during such intervals are modified by selection variables and posted to the controller at step 360. Selection variables are Boolean variables, one for each capability, that become either TRUE (the capability is selected) or FALSE (the capability is not selected). Selection variables are created automatically for each capability by the planning step.

Constraints on the selection variables determine that, for example, only one of several alternative capabilities for the same output can be selected (i.e., only its selection variables can be TRUE). Alternatively, work units in diagnostic capabilities may set special attributes for service, such as a Boolean attribute "service". This makes it possible to model non-standard capabilities and to distinguish a technician's jobs from regular jobs. The technician may also select arbitrary start and end ports within diagnostic capabilities as well as itineraries (sequences of module capabilities) that further constrain the diagnostic capability to be used. The modification of constraints is constraint-type-dependent. Allocation intervals in resource allocations, for example, are multiplied by the selection variables. The effect of these constraint modifications is that some constraints, such as a resource allocation, become only effective if the corresponding capability is being selected. The controller then posts to memory constraints on selection variables and common modules at step 370. At step 380 real-time constraints and order constraints are posted to the controller. Diagnostic jobs are given higher priority in the stream of desired jobs and are automatically scheduled at the earliest possible times and interleaved with regular jobs.

Since the correct output time must be used in the precedence constraints between capabilities of succeeding work units, the output variables of all alternative capabilities are connected to a single time variable, which is then used in the precedence constraints. The job constraints reserve resources for a job and all possible exit ports of capabilities being considered for work units in the job. If only part of a job is being scheduled at this point, the selected resource is reserved for the open-ended future, and otherwise for the duration of the job. The sequence of steps presented is only one example embodiment for the method disclosed herein. It will be apparent to one skilled in the art that numerous alternate step sequences would produce a similar result.

Figure 4:
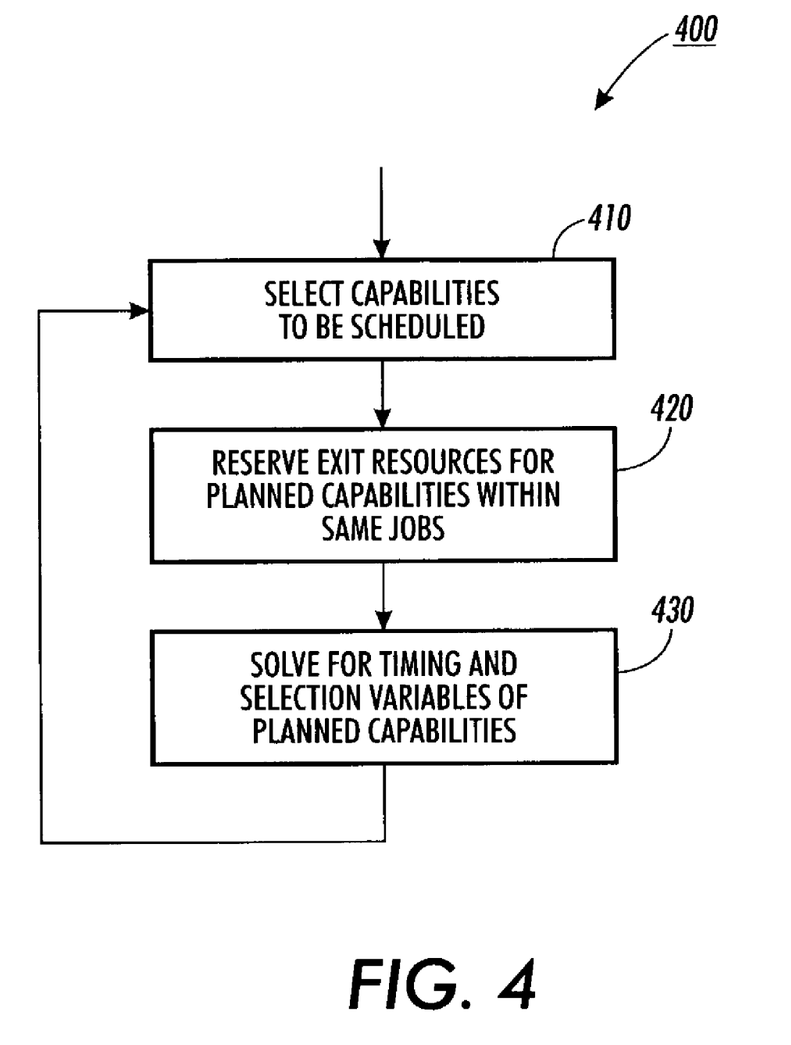
FIG. 4 provides a flow chart detailing the operation of the system scheduling component in accordance with one embodiment of the subject invention.

Turning now to FIG. 4, a flow chart illustrates the scheduling function 400 of the controller. Initially, the controller selects those capabilities to be scheduled, which may be all or a subset of the capabilities provided by the planning step. The controller then reserves exit resources for planned capabilities within the same jobs at step 420. Since all work units of the same job are constrained to be delivered to the same final exit port, the resource connected to that same final exit port, corresponding for example to a finisher stack in a print engine, cannot be used by other jobs until the job is finished. At step 430 the controller then solves for timing and selection variables of planned capabilities. This can be accomplished using a number of constraint solving or constrained optimization techniques, which are known to those skilled in the art.

One possible embodiment of a command set to illustrate the method disclosed herein is as follows:

```
        initialize schedule S and constraint store C;
repeat forever do
    determine sequence U of desired work units u at allowed exit ports P_u
        to be considered for scheduling next;
    prepend diagnostic work units to U with P_u={p_u} set to the desired port,
    for all work units u in U do
        if u is a diagnostic work unit then
            determine set S_u={s} of capability s such that u=work unit of s
                and a (potentially internal) exit port of s is in P_u
                and all way points on the itinerary are present in s;
            reduce capability s to the segment from entry port to exit port of u;
        else
            determine set S_u of capabilities s such that u = output work unit of s
                and exit port of s is in P_u
                and s does not use off-line resources;
        end if
        if S_u is empty then
            remove subsequent work units in same job from U;
        else
            add S_u to S;
            post to C: timing constraints of s_i in S_u, with selection variables b_i
                added;
            post to C: 1 = sum (s_i in S_u) b_i;
            post to C: real-time constraints for s_i in S_u;
            for all s_i in S_u, post to C: exit port of s_i = exit port of job of u; end for
            post to C: t_o = sum (s_i in S_u) b_i times output time of s_i;
            post to C: order constraint for t_o;
        end if
    end for
    solve for the undetermined time variables and selection variables in C;
    send commands to modules based on selected capabilities (b_i = 1) in S and
    determined time variables in C;
    clean up completed parts of S and C;
end repeat
```

However, it must be borne in mind that this sequence provides only one possible command set. One skilled in the art would readily appreciate that individual instructions could be varied in form and that the sequence in which steps are performed could vary, all of which embodiments are contemplated by the disclosure and spirit and scope of the claims herein.

This approach of integrated planning and scheduling eliminates the need for a separate, heuristics-based planning algorithm and leads to improved load balancing and productivity over previous approaches. Additionally, the system and method described herein is configuration-independent and thus easily reused for arbitrary reconfigurable production systems that can be modeled in this framework.

While the present invention has been illustrated and described with reference to specific embodiments, further modification and improvements will occur to those skilled in the art. For example, the steps for the planning and scheduling method disclosed herein are not required to be performed in a specified sequence, as will be apparent to one skilled in the art. Indeed, some steps may be executed concurrently with other steps. Also, constraints may be represented numerous different variations. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A computer controlled system for planning and scheduling the work flow for reconfigurable production systems having a plurality of modules with a plurality of alternative capabilities, the system comprising:

a system controller for enabling continued use of all available system modules by scheduling around at least one off-line module while interleaving at least one diagnostic work unit, wherein said controller receives descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;

at least one planning function for planning the concurrent production of regular and diagnostic work units, wherein said diagnostic work units comprise non-standard work units an operator wants the system to perform during servicing of said at least one off-line module, wherein said planning function uses said capability models to determine how to produce the said desired attributes of said regular and diagnostic work units; and at least one scheduling function for scheduling the concurrent production of regular and diagnostic work units, wherein said diagnostic work units are scheduled to be performed on said off-line module, wherein said scheduling function schedules selected capabilities and provides a set of scheduled capabilities in the form of commands to the plurality of modules and a separate set of commands to said off-line module.

2. The system for planning and scheduling the work flow for reconfigurable production systems according to claim 1, wherein said planning function comprises:
means for selecting at least one work unit to be planned;
means for determining if said work unit is a regular or diagnostic work unit;
means for determining a plurality of capabilities to produce said work unit if it is a diagnostic work unit;
means for determining capabilities to produce said work unit if it is a regular work unit, considering all reconfigurable production system module capabilities;
means for determining whether said capabilities to produce said regular work unit are available without utilizing off-line modules;
means for removing said regular work unit from consideration if said capabilities to produce said regular work unit are not available without utilizing off-line modules;
means for modifying constraints using selection variables;
means for posting constraints on selection variables and common modules to memory;
means for posting timing and precedence constraints to memory; and
means for reserving a selected resource if only part of a job is being scheduled.

3. The system for planning and scheduling reconfigurable production systems according to claim 2, wherein selecting a work unit to be planned is based on an input job description.

4. The system for planning and scheduling reconfigurable production systems according to claim 2, wherein determining capabilities to produce said diagnostic work unit further comprises specifying a desired exit port and itinerary.

5. The system for planning and scheduling reconfigurable production systems according to claim 2, wherein determining capabilities to produce said diagnostic work unit further comprises reducing said capabilities to a segment desired for said diagnostic work unit.

6. The system for planning and scheduling reconfigurable production systems according to claim 4, further comprising selecting alternative capabilities from the reconfigurable production system modules.

7. The system for planning and scheduling reconfigurable production systems according to claim 2, wherein said selection variables are created automatically for each capability.

8. The system for planning and scheduling reconfigurable production systems according to claim 2, wherein said selection variables comprise Boolean variables.

9. The system for planning and scheduling reconfigurable production systems according to claim 2, wherein said modified constraints comprise timing constraints.

10. The system for planning and scheduling reconfigurable production systems according to claim 2, wherein said modified constraints comprise the reservation of resources during intervals in which reconfigurable production system modules are occupied.

11. The system for planning and scheduling reconfigurable production systems according to claim 2, wherein posting timing and precedence constraints comprises connecting variables of all alternative capabilities to a single time variable.

12. The system for planning and scheduling reconfigurable production systems according to claim 1, wherein said scheduling function comprises:
means for selecting capabilities to be scheduled;
means for reserving exit resources for planned capabilities; and
means for solving for timing and selection variables.

13. The system for planning and scheduling reconfigurable production systems according to claim 2, further comprising means for acquiring at least one capability model from at least one machine module.

14. The system for planning and scheduling reconfigurable production systems according to claim 1, wherein said machine module comprises a print engine module.

15. The system for planning and scheduling reconfigurable production systems according to claim 1, wherein said machine module comprises an analysis module.

16. The system for planning and scheduling reconfigurable production systems according to claim 1, wherein said machine module comprises a manufacturing line module.

17. The system for planning and scheduling reconfigurable production systems according to claim 1, wherein said machine module comprises a packaging line module.

18. A method for planning and scheduling the work flow for computer controlled reconfigurable production systems having a plurality of modules with a plurality of alternative capabilities, comprising:
utilizing the system controller for enabling continued use of all available system modules by scheduling around at least one off-line module while interleaving at least one diagnostic work unit, wherein said system controller is utilized to receive descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;

planning the work flow for concurrent production of regular and at least one diagnostic work unit, wherein said diagnostic work units comprise non-standard work units an operator wants the system to perform during servicing of at least one off-line module, wherein said concurrent production includes continued use of all available system modules while interleaving said at least one diagnostic work unit, wherein said planning utilizes said capability models to determine how to produce the said desired attributes of said regular and diagnostic work units; and scheduling the work flow for concurrent production of regular and diagnostic work units, wherein said diagnostic work units are scheduled to be performed on said off-line module, wherein said scheduling includes utilizing selected capabilities and providing a set of scheduled capabilities in the form of commands to the plurality of modules and a separate set of commands to said off-line module.

19. A method for planning and scheduling the work flow for computer controlled reconfigurable production systems according to claim 18, wherein planning said work flow comprises:

acquiring a description of work units to be produced;
selecting at least one of said work units to be planned;
determining whether said work unit comprises a diagnostic work unit or a regular work unit;
determining the capabilities needed to produce said diagnostic work unit;
determining the capabilities needed to produce said regular work unit without utilizing off-line modules;
modifying constraints using selection variables;
posting constraints on selection variables and common modules to memory; and
posting timing and precedence constraints to memory.

20. A method for planning and scheduling the work flow for computer controlled reconfigurable production systems having a plurality of modules according to claim 19, wherein determining the capabilities needed to produce said diagnostic work unit further comprises identifying a desired exit port and itinerary.

21. A method for planning and scheduling the work flow for computer controlled reconfigurable production systems having a plurality of modules according to claim 19, wherein determining the capabilities needed to produce said regular work unit comprises selecting alternative capabilities from the reconfigurable production system modules capabilities.

22. A method for planning and scheduling the work flow for computer controlled reconfigurable production systems having a plurality of modules according to claim 19, further comprising determining whether the capabilities needed to produce said diagnostic and said regular work units are available.

23. A method for planning and scheduling the work flow for computer controlled reconfigurable production systems according to claim 19, wherein said modified constraints comprise timing constraints.

24. A method for planning and scheduling the work flow for computer controlled reconfigurable production systems according to claim 19, wherein said modified constraints comprise the reservation of resources during the intervals in which reconfigurable production system modules are occupied.

25. A method for planning and scheduling the work flow for computer controlled reconfigurable production systems according to claim 19, wherein said selection variables are created automatically for each capability.

26. A method for planning and scheduling the work flow for computer controlled reconfigurable production systems according to claim 19, wherein said selection variables comprise Boolean variables.

27. A method for planning and scheduling the work flow for computer controlled reconfigurable production systems according to claim 19, wherein said precedence constraints comprise connecting the output variables of all alternative capabilities to a single time variable.

28. A method for planning and scheduling the work flow for computer controlled reconfigurable production systems according to claim 19, further comprising reserving a selected resource if only part of a job is being scheduled.

29. A method for planning and scheduling the work flow for computer controlled reconfigurable production systems according to claim 18, wherein scheduling the work flow for the plurality of modules in the reconfigurable production system comprises:

selecting capabilities to be scheduled;
reserving exit resources for planned capabilities within the same jobs; and
solving for timing and selection variables of planned capabilities.

30. A method for planning and scheduling the work flow for computer controlled reconfigurable production systems according to claim 29, wherein said selected capabilities include a subset of capabilities needed to produce said work unit.

31. A method for planning and scheduling the work flow for computer controlled reconfigurable production systems according to claim 29, wherein said selected capabilities include all of the capabilities needed to produce said work unit.

32. A method for planning and scheduling the work flow for computer controlled reconfigurable production systems according to claim 19, wherein said capabilities comprise capability models for at least one machine module.

33. A method for planning and scheduling the work flow for computer controlled reconfigurable production systems according to claim 19, wherein said capabilities comprise feature constraints.

34. A method for planning and scheduling the work flow for computer controlled reconfigurable production systems according to claim 19, wherein said capabilities comprise timing constraints.

35. An article of manufacture comprising a computer usable medium having computer readable program code embodied in said medium which, when said program code is executed by said computer causes said computer to perform method steps for planning and scheduling computer controlled reconfigurable production systems, said method comprising:

utilizing the system controller for enabling continued use of all available system modules by scheduling around at least one off-line module while interleaving at least one diagnostic work unit, wherein said system controller is utilized to receive descriptions of at least one work unit with its desired attributes, capability models from each of the plurality of modules, and the current state of the system, including operations currently being performed by the modules and capabilities previously planned and scheduled, wherein said capability models include timing constraints, feature constraints, and commands, wherein said timing constraints include the duration of execution of a capability, the time during which a module is occupied, or the reservation of a module, wherein said feature constraints include limits on the size of the work units being processed and transformation of the work units, and wherein said commands include the names or identifications of the operations corresponding to the capabilities, together with timing information;

planning the work flow for concurrent production of regular and at least one diagnostic work unit, wherein said diagnostic work units comprise non-standard work units an operator wants the system to perform during servicing of at least one off-line module, wherein said concurrent production includes continued use of all available system modules while interleaving said at least one diagnostic work unit, wherein said planning utilizes said capability models to determine how to produce the said desired attributes of said regular and diagnostic work units; and scheduling the work flow for concurrent production of regular and diagnostic work units, wherein said diagnostic work units are scheduled to be performed on said off-line module, wherein said scheduling includes utilizing selected capabilities and providing a set of scheduled capabilities in the form of commands to the plurality of modules and a separate set of commands to said off-line module.

36. An article of manufacture comprising a computer usable medium having computer readable program code embodied in said medium which, when said program code is executed by said computer causes said computer to perform method steps for planning and scheduling computer controlled reconfigurable production systems according to claim 35, wherein planning said work flow comprises:

acquiring a description of work units to be produced;
selecting at least one of said work units to be planned;
determining whether said work unit comprises a diagnostic work unit or a regular work unit;
determining the capabilities needed to produce said diagnostic work unit;
determining the capabilities needed to produce said regular work unit without utilizing off line modules;
modifying constraints using selection variables;
posting constraints on selection variables and common modules to memory; and
posting timing and precedence constraints to memory.

37. An article of manufacture comprising a computer usable medium having computer readable program code embodied in said medium which, when said program code is executed by said computer causes said computer to perform method steps for planning and scheduling computer controlled reconfigurable production systems according to claim 35, wherein scheduling said work flow:

selecting capabilities to be scheduled;
reserving exit resources for planned capabilities within the same jobs; and
solving for timing and selection variables of planned capabilities.

* * * * *